(12) United States Patent
Rockenbeck et al.

(10) Patent No.: US 7,016,838 B2
(45) Date of Patent: *Mar. 21, 2006

(54) METHOD AND SYSTEM FOR FRAME ALIGNMENT AND UNSUPERVISED ADAPTATION OF ACOUSTIC MODELS

(75) Inventors: William H. Rockenbeck, Redmond, WA (US); Milind V. Mahajan, Redmond, WA (US); Fileno A. Alleva, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,529

(22) Filed: Nov. 12, 2004

(65) Prior Publication Data

US 2005/0071162 A1 Mar. 31, 2005

Related U.S. Application Data (62) Division of application No. 09/746,583, filed on Dec. 22, 2000, now Pat. No. 6,917,918.

(51) Int. Cl.
*G10L 15/06* (2006.01)
(52) U.S. Cl. ...................... 704/244; 704/243
(58) Field of Classification Search .............. None
See application file for complete search history.

(56) References Cited

U.S. PATENT DOCUMENTS

| | | | |
|---|---|---|---|
| 5,651,094 A | 7/1997 | Takagi et al. | 704/224 |
| 5,819,223 A | 10/1998 | Takagi | 704/256 |
| 5,907,825 A | 5/1999 | Tzirkel-Hancock | 704/243 |
| 5,920,837 A | 7/1999 | Gould et al. | 704/251 |
| 6,917,918 B1 * | 7/2005 | Rockenbeck et al. | 704/244 |

OTHER PUBLICATIONS

"Tree-structured Models of Parameter Dependence for Rapid Adaptation in Large Vocabulary Conversational Speech Recognition", by A. Kannan et al., 1999 IEEE International Conference on Acoustics, Speech, and Signal Processing, vol. 2, p. 769-72 (Mar. 1999).
"N-Best Based Supervised and Unsupervised Adaptation for Native and Non-Native Speakers in Cars", by P. Nguyen et al., 1999 IEEE International Conference on Acoustics, Speech and Signal Processing, vol. 1, p. 173-6 (Mar. 1999).
"Unsupervised Adaptation Using Structural Bayes Approach", by K. Shinoda et al., Proceedings of the 1998 IEEE International Conference on Acoustics, Speech and Signal Processing, vol. 2, p. 793-6 (May 1998).

(Continued)

*Primary Examiner*—Donald L. Storm
(74) *Attorney, Agent, or Firm*—Theodore M. Magee; Westman, Champlin & Kelly, P.A.

(57) ABSTRACT

An unsupervised adaptation method and apparatus are provided that reduce the storage and time requirements associated with adaptation. Under the invention, utterances are converted into feature vectors, which are decoded to produce a transcript and alignment unit boundaries for the utterance. Individual alignment units and the feature vectors associated with those alignment units are then provided to an alignment function, which aligns the feature vectors with the states of each alignment unit. Because the alignment is performed within alignment unit boundaries, fewer feature vectors are used and the time for alignment is reduced. After alignment, the feature vector dimensions aligned to a state are added to dimension sums that are kept for that state. After all the states in an utterance have had their sums updated, the speech signal and the alignment units are deleted. Once sufficient frames of data have been received to perform adaptive training, the acoustic model is adapted.

21 Claims, 4 Drawing Sheets

OTHER PUBLICATIONS

"Long Term On-line Speaker Adaptation for Large Vocabulary Dictation", by E. Thelen, Proceedings ICSLP 96. Fourth International Conference on Spoken Language Processing, vol. 4, p. 2139-42 (Oct. 1996).

"Rapid Unsupervised Adaptation to Children's Speech on A Connected-digit Task", by D.C. Burnett et al., Fourth International Conference on Spoken Language Processing, vol. 2, p. 1145-8 (Oct. 1996).

"Iterative Unsupervised Adaptation Using Maximum Likelihood Linear Regression", by P.C. Woodland et al., Proceedings ICSLP 96. Fourth International Conference on Spoken Language Processing, vol. 2, p. 1133-6 (Oct. 1996).

"An Experimental Study of Acoustic Adaptation Algorithms", by A. Sankar et al., 1996 IEEE International Conference on Acoustics Speech, and Signal Processing Conference Proceedings, vol. 2, p. 713-16 (May 1996).

"Unsupervised Adaptation to New Speakers in Feature-Based Letter Recognition", by M.J. Lasry, ICASSP 84. Proceedings of the IEEE International Conference on Acoustics, Speech and Signal Processing, vol. 2, p. 17.6/1-4 (Mar. 1984).

Lee, Chin-Hui, "Adaptive Compensation for Robust Speech Recognition," Proc. 1997 IEEE Workshops on Automatic Speech Recognition and Understanding 1997, Dec. 14-17, 1997, pp. 357-364.

U.S. Appl. No. 09/746,583, filed Dec. 22, 2000.

* cited by examiner

METHOD AND SYSTEM FOR FRAME ALIGNMENT AND UNSUPERVISED ADAPTATION OF ACOUSTIC MODELS

This application is a divisional of and claims priority from U.S. application Ser. No. 09/746,583 filed on Dec. 22, 2000 and entitled "METHOD AND SYSTEM FOR FRAME ALIGNMENT AND UNSUPERVISED ADAPTATION OF ACOUSTIC MODELS" now U.S. Pat. No. 6,917,918.

BACKGROUND OF THE INVENTION

The present invention relates to adaptive training for speech recognition systems. In particular, the present invention relates to unsupervised adaptive training.

Speech recognition systems identify words in speech signals. To do this, most speech recognition systems compare the speech signal to models associated with small acoustic units that form all speech. Each comparison generates a likelihood that a particular segment of speech corresponds to a particular acoustic unit.

The acoustic models found in most speech recognition systems are trained using speech signals that are developed in an environment that is different from the environment in which the speech recognition system is later used. In particular, the speakers, microphones, and noise levels used during training are almost always different from the speaker, microphone, and noise level that is present when the speech recognition system is actually used.

It has been recognized that the differences between the training data and the actual data (usually referred to as test data) used during recognition degrades the performance of the speech recognition system.

One technique that has been used to address the differences between the training data and the test data is to adaptively change the acoustic models based on a collection of test data. Thus, a model that is initially trained on training data is modified based on actual speech signals generated while the speech recognition system is being used in the field.

Two types of adaptation have been used in the past: supervised adaptation and unsupervised adaptation. In supervised adaptation, the user reads from a script during an enrollment session. The system then uses the user's speech signal to adjust the models for the various acoustic units represented in the script. Although supervised adaptation is generally considered more accurate than unsupervised adaptation, it is also very boring for the users.

In unsupervised adaptation, the system adapts the acoustic model based on the user's normal use of the speech recognition system. Because the system has no way to predict what the user will say, it does not have an exact transcript of the speech signal. Instead, the system uses the acoustic model to decode the speech signal and thereby form the transcript. This decoded transcript is then used to update the model.

One major problem with unsupervised adaptation is that it requires a significant amount of time and data. In particular, in most prior art systems, the digital input speech signal or features derived from the speech signal must be stored until there is enough speech for adaptive training. Because it is difficult to predict the length of an utterance, it is difficult to estimate the size of the digitized speech signal. Because of this, the systems cannot accurately predict how much storage space will be needed to store the speech data. As a result, the system must be equipped to handle a full disc error message at any time during the speech storage stage or must reserve enough disc space so that there is sufficient space to handle the worst case size for the .WAV files. Since it is undesirable to have applications reserving more disc space than they absolutely need, such an overestimation of the space needed for the digitized speech signal should be avoided.

The time required to perform the training is dominated by a step of aligning individual frames of speech with a particular acoustic unit found in the transcription. The time needed to perform this alignment is typically a function of the square of the number of frames that need to be aligned. Thus, a system is needed that reduces the time needed to align frames of speech data.

SUMMARY OF THE INVENTION

An unsupervised adaptation method and apparatus are provided that reduce the storage and time requirements associated with adaptation. Under the invention, utterances are converted into feature vectors, which are decoded to produce a transcript and alignment unit boundaries for the utterance. Individual alignment units and the feature vectors associated with those alignment units are then provided to an alignment function, which aligns the feature vectors with the states of each alignment unit. Because the alignment is performed within alignment unit boundaries, fewer feature vectors are used and the time for alignment is reduced. After alignment, the feature vector dimensions aligned to a state are added to dimension sums that are kept for that state. After all the states in an utterance have had their sums updated, the speech signal and the alignment units are deleted. Once sufficient frames of data have been received to perform adaptive training, the acoustic model is adapted.

DETAILED DESCRIPTION OF ILLUSTRATIVE EMBODIMENTS

Figure 1:
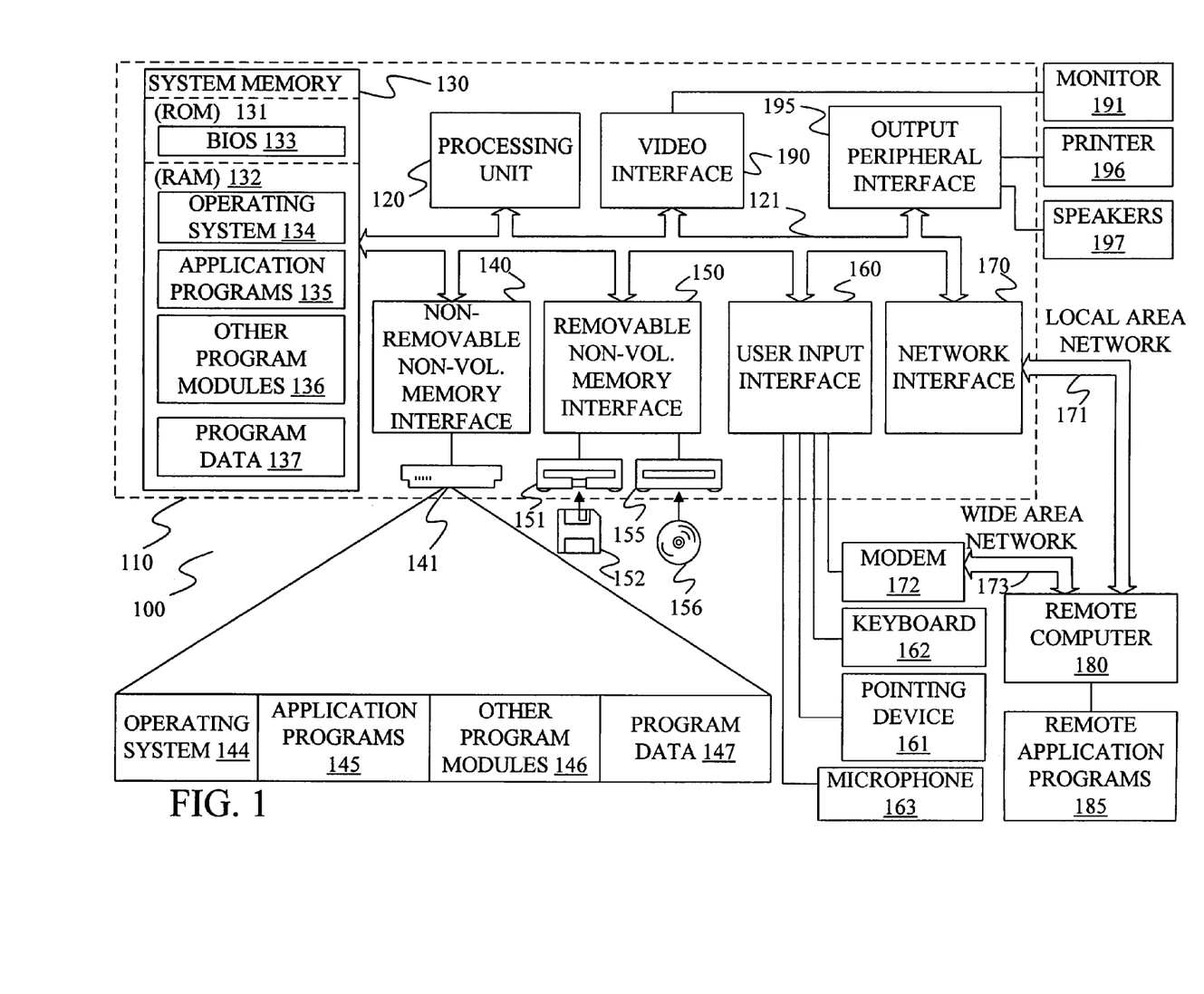
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
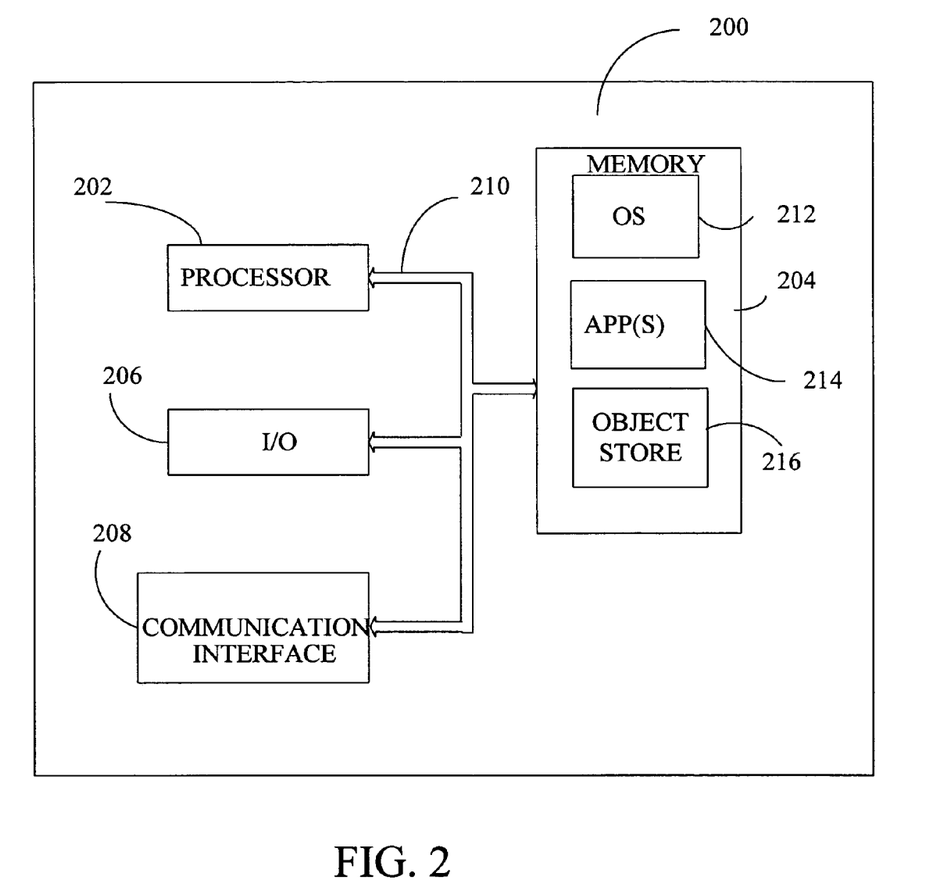
FIG. 2 is a block diagram of a general mobile computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
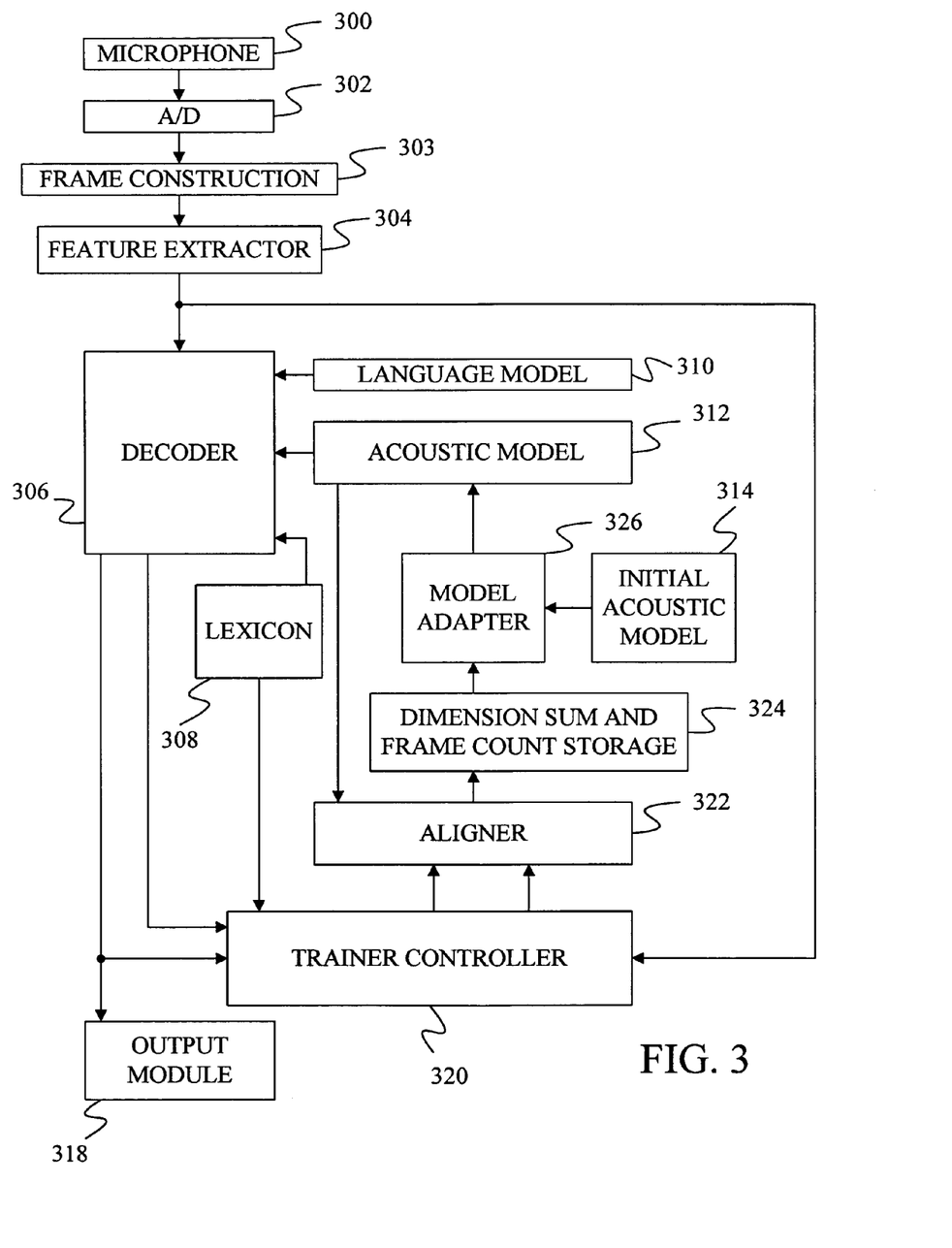
FIG. 3 is a block diagram of a speech recognition system under the present invention.

FIG. 3 provides a more detailed block diagram of modules that are particularly relevant to the present invention. In FIG. 3, an input speech signal is converted into an electrical signal, if necessary, by a microphone 300. The electrical signal is then converted into a series of digital values by an analog-to-digital converter 302. In several embodiments, A-to-D converter 302 samples the analog signal at 16 kHz thereby creating 32 kilobytes of speech data per second.

The digital data is provided to a frame construction unit 303, which groups the digital values into frames of values. In one embodiment, each frame is 25 milliseconds long and begins 10 milliseconds after the beginning of the previous frame.

The frames of digital data are provided to a feature extractor 304, which extracts a feature from the digital signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a single multi-dimensional feature vector per frame. The number of dimensions or values in the feature vector is dependent upon the type of feature extraction that is used. For example, mel-frequency cepstrum coefficient vectors generally have 39 dimensions. Thus, for such feature vectors, each frame is associated with 39 values that form the feature vector.

The stream of feature vectors produced by feature extractor 304 is provided to a decoder 306, which identifies a most likely sequence of words based on the stream of feature vectors, a lexicon 308, a language model 310, and an acoustic model 312.

In most embodiments, acoustic model 312 is a Hidden Markov Model consisting of a set of hidden states, with one state per frame of the input signal. Each state has an associated set of probability distributions that describe the likelihood of an input feature vector matching a particular state. In some embodiments, a mixture of probabilities (typically 10 Gaussian probabilities) is associated with each state. The model also includes probabilities for transitioning between two neighboring model states as well as allowed transitions between states for particular linguistic units. The size of the linguistic units can be different for different embodiments of the present invention. For example, the linguistic units may be senones, phonemes, diphones, triphones, syllables, or even whole words.

Before adaptive training, acoustic model 312 is the same as an initial acoustic model 314. In most embodiments, the initial acoustic model 314 has been trained based on speech signals from a variety of speakers. As such, it is considered a speaker-independent model.

Lexicon 308 consists of a list of linguistic units (typically words or syllables) that are valid for a particular language. Decoder 306 uses lexicon 308 to limit its search for possible linguistic units to those that are actually part of the language. The lexicon also contains pronunciation information (i.e. mappings from each linguistic unit to a sequence of acoustic units used by the acoustic model.

Language model 310 provides a set of likelihoods that a particular sequence of linguistic units will appear in a particular language. In many embodiments, the language model is based on a text database such as the North American Business News (NAB), which is described in greater detail in a publication entitled CSR-III Text Language Model, University of Penn., 1994. The language model may be a context-free grammar, a statistical N-gram model such as a trigram, or a combination of both. In one embodiment, the language model is a compact trigram model that determines the probability of a sequence of words based on the combined probabilities of three-word segments of the sequence.

Based on the acoustic model, the language model, and the lexicon, decoder 306 identifies a most likely sequence of linguistic units from all possible linguistic unit sequences. This sequence of linguistic units represents a transcript of the speech signal. Decoder 306 also provides an indication of the starting frame number and ending frame number associated with an alignment unit. An alignment unit can be any unit that is aligned with frames of the speech signal by the decoder. In most embodiments, the alignment units are the linguistic units identified by the decoder. However, in other embodiments, the alignment units can be collections of linguistic units (phrases), phonemes, or sub-phonemes. Thus, by indicating the starting frame and ending frame associated with each alignment unit decoder 306 indicates the alignment between the frames and the alignment unit boundaries.

The transcript is provided to an output model 318, which handles the overhead associated with transmitting the transcript to one or more applications. In one embodiment, output module 318 communicates with a middle layer that exists between the speech recognition engine of FIG. 3 and one or more applications.

Under the present invention, the transcript provided by decoder 306 is also used to perform unsupervised adaptation of acoustic model 312. A method for performing such adaptation is described below with reference to the block diagram of FIG. 3 and a flow diagram shown in FIG. 4.

Figure 4:
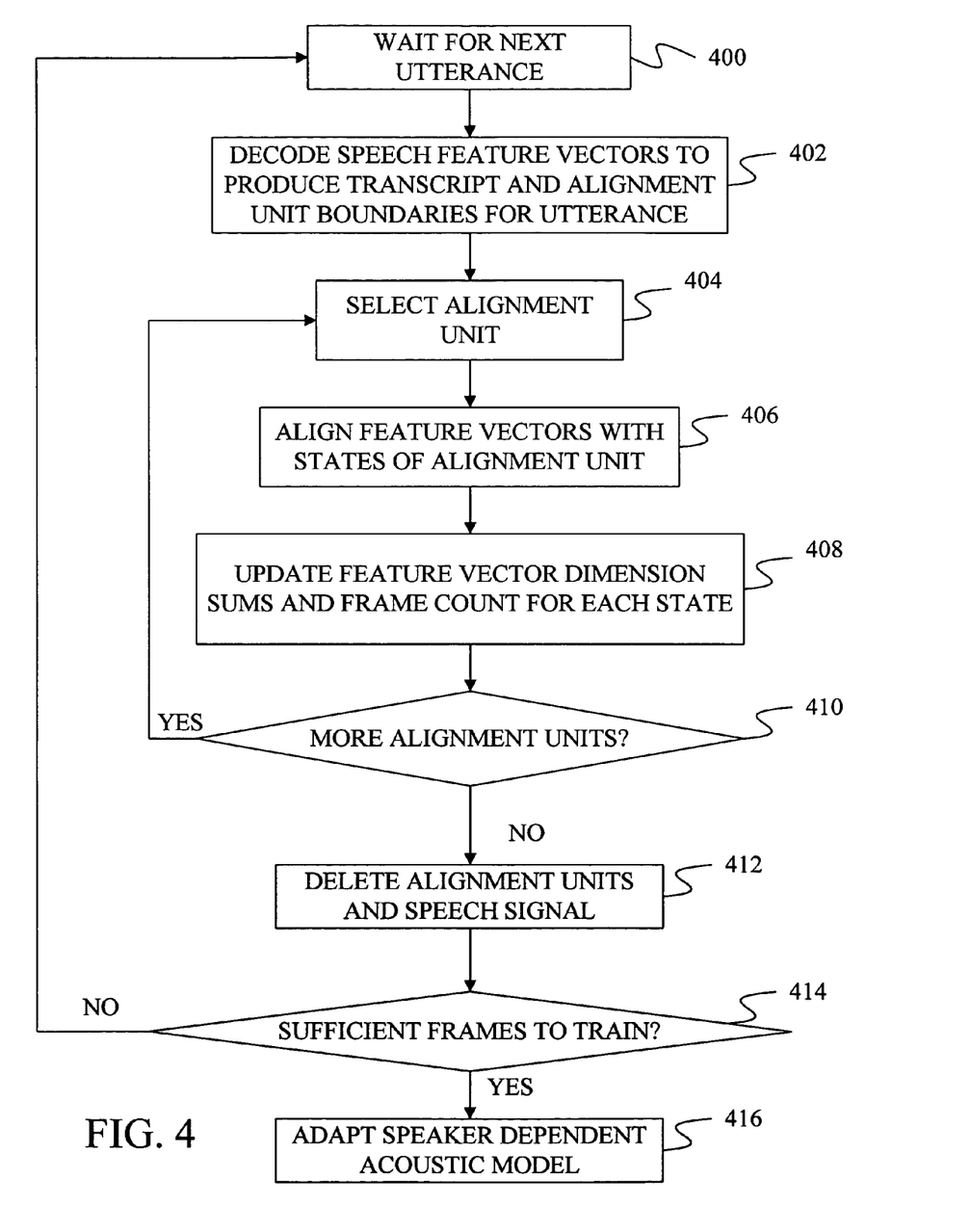
FIG. 4 is a flow diagram of a method for unsupervised adaptation under the present invention.

At step 400 of FIG. 4, the speech recognition system of FIG. 3 waits for an utterance from a user. In this context, an utterance is a speech signal of any length that is delimited by pauses or relative silence. When it receives an utterance, the speech recognition system generates the feature vectors associated with the speech signal and decodes the feature vectors to produce a transcript and a set of alignment unit boundaries as described above. This step of decoding is shown as step 402 in FIG. 4.

The transcript is provided to a trainer controller 320 of FIG. 3 along with the alignment unit boundary information provided by decoder 306 and the feature vectors provided by feature extractor 304. For each alignment unit in the transcript, trainer controller 320 uses lexicon 308 to identify the acoustic units (typically phonemes) that form the alignment unit. Trainer controller 320 also identifies the feature vectors associated with each alignment unit based on the alignment unit boundaries and the sequence of feature vectors. In step 404 of FIG. 4, the acoustic units and feature vectors for the first alignment unit in the utterance are passed to an aligner 322.

At step 406, aligner 322 aligns the feature vectors with the individual states that form the acoustic units of the alignment unit. The same state within an acoustic unit may be repeated any number of times. Under embodiments that use a Viterbi training method, only a single feature vector can be assigned to a single occurrence of a state. However, a group of feature vectors may all be assigned to different occurrences of the same state in an acoustic unit. The states found in each acoustic unit are provided by acoustic model 312.

In other embodiments that utilize Forward-Backward training, the alignment step assigns a fraction of each frame to a number of different states. The fraction of the frame that is assigned to each state is based on the likelihood that the frame of speech is aligned with the state.

Techniques for aligning feature vectors with states are well known in the art. For example, see *Fundamentals of Speech Recognition*, Lawrence Rabiner & Biin-Hwang Juang, Prentice Hall, 1993 (Particulary Sec. 4.7, Time Alignment and Normalization).

The time needed to align the states with the feature vectors is a function of the number of states multiplied by the number of feature vectors. Because the present invention aligns the states and feature vectors on an alignment unit-by-alignment unit basis instead of on an utterance basis, it reduces the amount of time needed to perform the alignment. The time savings can be roughly represented as:

$$O\left(\sum_{n=1}^{N} S_n * \sum_{n=1}^{N} F_n\right) - \sum_{n=1}^{N} O(S_n * F_n) \quad \text{EQ. 1}$$

where O( ) represents an alignment time function, N is the total number of alignment units in an utterance, S is the number of states in an alignment unit and F is the number of feature vectors associated with an alignment unit.

After the feature vectors have been aligned with the states, the feature vectors are used at step 408 to update dimension sums and frame counts for each state in the alignment unit. Each state contains a separate dimension sum for each dimension of the feature vector. Thus, if each feature vector had 39 dimensions, each state would have 39 dimension sums.

Under a Viterbi training method, a dimension sum for a state is updated by adding the value of the dimension found in each feature vector that was aligned with the state. Thus, if a state was aligned with three feature vectors, each dimension sum in the state would have three values added to it, one for each vector.

The frame count for a state keeps track of the number of vectors that have been assigned to the state. Thus, if three vectors were assigned to a state for the current word, the frame count would be updated by adding "3" to the count. The updated dimensions sums and frame counts are stored in a memory storage 324 in FIG. 3.

Additional statistics needed for acoustic model adaptation (such as sum of squares of feature values) may also be collected in a similar manner. The choice of the statistics that are collected depends upon the details of the chosen adaptation method.

In embodiments that use Forward-Backward training, each dimension sum is updated by multiplying each feature vector assigned to the state by the alignment probability for the frame/state pair and adding the products to the sum. Similarly, the frame count is updated by adding all of the new frame/state probabilities associated with a state.

In still further embodiments that use a mixture of Gaussians at each state, a separate dimension sum and a separate frame count are maintained for each mixture component. The feature vector values and the frame count values associated with a frame/state pair are then distributed across the dimension sums and frame counts of the mixture components based on how well the feature vector matches each component Gaussian.

At step 410 of FIG. 4, trainer controller 320 determines if there are more alignment units in the current utterance. If there are more alignment units, the process of FIG. 4 returns to step 404 so that the next alignment unit in the utterance can be aligned with its feature vectors and have its states' dimension sums updated.

If there are no more alignment units in the utterance, the process continues at step 412, where the transcript for the current utterance is output by output module 318 and then deleted from the speech recognition memory along with the feature vectors and any digital representations of the speech signal that may have been stored in the recognition system. Thus, after step 412, only the dimension sums and the frame counts are left as indications of the utterance. Since these sums take a fixed pre-determinable amount of disc space, they are easier to store than the actual speech signal, as was done in the prior art.

After the transcript and speech signal have been deleted, the process continues at step 414 where a model adapter 326 determines if there has been enough speech to warrant adapting the acoustic model. In one embodiment, five minutes of speech since the last adaptation is considered enough to warrant performing another adaptation of the model. If more speech is desired before adaptation, the process returns to step 400 to wait for the next utterance.

If there is enough speech for adaptation, model adapter 326 adapts an initial acoustic model 314 using the dimension sums and frame counts from storage 324 to form a new version of acoustic model 312 at step 416. In particular, the sums are divided by their respective frame counts to form an average value for each dimension in each state found in the current set of utterances. These average values are then used to adaptively train the models for each dimension in each state.

Any known methods of unsupervised adaptation may be used. In one embodiment, a combination of Maximum Likelihood Linear Regression (MLLR) and Maximum A Posteriori (MAP) adaptation are used to adapt the initial acoustic model 314. However, other adaptation techniques may be used within the scope of the present invention.

In one embodiment, the dimension sums and frame counts are maintained even after adaptation. Thus, with each adaptation iteration, these sums grow larger. Under such embodiments, the adaptation is performed on the initial acoustic model at each iteration and is not performed on a previously adapted acoustic model. In other embodiments, the sums are cleared after each adaptation iteration and the latest version of the acoustic model is trained during the next adaptation iteration.

In one embodiment, the step of adapting the acoustic model is performed on a separate thread from the thread on which the speech decoding, frame alignment and dimension sum updating operate. In particular, a relatively low priority thread may be used for the adaptation. This reduces the degree to which the adaptation affects the decoding process. Although it is operating on a separate thread, the model adapter may update acoustic model 312 without performing a lockout operation on the model since the model adapter is the only module that writes to the acoustic model. Thus, decoder 306 may continue to use the model parameters even while model adapter 326 is updating the model.

Although the process of using alignment unit boundaries to align acoustic states with the frames of a speech signal has been described in connection with unsupervised training, this aspect of the present invention is not limited to unsupervised training. In other embodiments, it is used as part of supervised training and in still further embodiments it is used in methods unrelated to training.

Although the present invention has been described with reference to preferred embodiments, workers skilled in the art will recognize that changes may be made in form and detail without departing from the spirit and scope of the invention. In particular, although the modules of FIG. 3 have been described as existing within closed computing environment, in other embodiments, the modules are distributed across a networked computing environment.

What is claimed is:

1. A method of storing speech information for use in retraining a speech model, the method comprising:
   receiving a speech signal;
   identifying at least one feature value for each frame of a set of frames of the speech signal;
   decoding the speech signal based on the speech model to identify a sequence of alignment units in the speech signal;
   aligning a state of an alignment unit from the sequence of alignment units with a frame in the set of frames of the speech signal; and
   before receiving enough frames of the speech signal to begin retraining, adding at least one feature value that is identified for a frame to a feature value sum that is associated with the state that is aligned with the frame and storing the sum as speech information.

2. The method of claim 1 wherein the speech signal comprises a single utterance.

3. The method of claim 1 wherein the steps of identifying, decoding, aligning, and adding are repeated for each of a plurality of utterances.

4. The method of claim 1 wherein decoding the speech signal further comprises assigning frames to alignment units and wherein aligning comprises aligning states that form the alignment unit with frames assigned to the alignment unit.

5. The method of claim 4 wherein the alignment unit is a word.

6. A speech recognition system for recognizing linguistic units in a speech signal, the system comprising:
   an acoustic model;
   a decoder that uses the acoustic model to identify alignment units in the speech signal and to recognize linguistic units in the speech signal;
   an aligner that aligns states of the alignment units identified by the decoder with frames of the speech signal;
   a dimension sum storage that stores a feature dimension sum that is associated with a state of the alignment units, at least one state's sum updated before a sufficient number of frames of the speech signal are available to train the acoustic model, each state's sum updated by summing dimension values from feature vectors assigned to frames aligned with the state; and
   a model adapter that uses the feature dimension sum to train the acoustic model after a sufficient number of frames of the speech signal are available.

7. The speech recognition system of claim 6 further comprising an initial acoustic model, wherein the model adapter trains the acoustic model by adapting the parameters of the initial acoustic model to form a new version of the acoustic model.

8. The speech recognition system of claim 6 wherein the model adapter is a set of computer-executable instructions that are processed on a different thread from the decoder.

9. The speech recognition system of claim 6 wherein the decoder assigns frames of the speech signal to words and wherein the aligner aligns the frames assigned to a word with states of the word.

10. A method of aligning frames of a speech signal to states, the method comprising:

identifying a sequence of alignment units from the speech signal and identifying a set of frames that are associated with each alignment unit in the sequence;

for each alignment unit in the sequence of alignment units:

identifying the states of the alignment unit; and aligning the set of frames associated with the alignment unit with the states of the alignment unit.

11. The method of claim 10 wherein the method is part of a process of associating feature vectors that represent the speech signal with states of words.

12. The method of claim 11 wherein there is one feature vector per frame and each feature vector comprises a plurality of dimensions.

13. The method of claim 12 wherein the method is used in a process of adapting an acoustic model that further comprises generating a set of dimension sums for each state, each dimension sum being associated with a different dimension of the feature vectors, a dimension sum being formed by summing at least a portion of the values of a respective dimension from all of the feature vectors associated with a state.

14. The method of claim 13 wherein the process of adapting an acoustic model further comprises using the dimension sums to adapt the acoustic model.

15. The method of claim 14 wherein the process of adapting an acoustic model further comprises using the dimension sums to change the parameters of an initial acoustic model to form an adapted acoustic model.

16. A frame alignment system for aligning frames of speech with acoustic states found in alignment units, the alignment system comprising:

a decoder that identifies a sequence of alignment units from a speech signal and associates respective sets of frames of the speech signal with alignment units in the sequence of alignment units;

a trainer controller that identifies acoustic states of the alignment units in the sequence of alignment units; and an aligner that aligns the acoustic states of an alignment unit in the sequence with frames in the set of frames associated with the alignment unit.

17. The frame alignment system of claim 16 further comprising an acoustic model that is used by the decoder to identify the sequence of alignment units from the speech signal.

18. The frame alignment system of claim 17 wherein the frame alignment system forms part of a model adaptation system for adapting the acoustic model.

19. The frame alignment system of claim 18 wherein the model adaptation system further comprises a feature extractor that generates a feature vector for each frame of the speech signal, each feature vector comprising a plurality of dimension values for respective dimensions of the feature vector.

20. The frame alignment system of claim 19 wherein the model adaptation system further comprises a dimension sum storage for storing a plurality of dimension sums for each state, each dimension sum being associated with a dimension of the feature vectors and being formed by adding the dimension values for that dimension that are found in the feature vectors that are associated with frames aligned with the state.

21. The frame alignment system of claim 20 wherein the model adaptation system further comprises a model adapter that uses the dimension sums to adapt the acoustic model.

* * * * *